United States Patent
Cadigan et al.

(10) Patent No.: US 10,585,672 B2
(45) Date of Patent: Mar. 10, 2020

(54) MEMORY DEVICE COMMAND-ADDRESS-CONTROL CALIBRATION

(71) Applicant: International Business Machines Corporation, Armonk, NY (US)

(72) Inventors: David D. Cadigan, Poughkeepsie, NY (US); Stephen P. Glancy, Poughkeepsie, NY (US); William V. Huott, Holmes, NY (US); Kyu-hyoun Kim, Chappaqua, NY (US); Adam J. McPadden, Underhill, VT (US); Anuwat Saetow, Austin, TX (US); Gary A. Tressler, Sandy Hook, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 15/099,047

(22) Filed: Apr. 14, 2016

(65) Prior Publication Data

US 2017/0300338 A1    Oct. 19, 2017

(51) Int. Cl.
*G06F 9/44* (2018.01)
*G06F 1/04* (2006.01)
*G06F 9/4401* (2018.01)

(52) U.S. Cl.
CPC .............. *G06F 9/4403* (2013.01); *G06F 1/04* (2013.01)

(58) Field of Classification Search
CPC .................................................. G06F 9/4403
See application file for complete search history.

(56) References Cited

U.S. PATENT DOCUMENTS

| 6,735,709 B1* | 5/2004 | Lee ................... G01R 31/31937 702/89 |
| 7,279,955 B2 | 10/2007 | Jin |
| 7,366,931 B2* | 4/2008 | Vogt ......................... G11C 5/04 713/300 |
| 8,407,633 B2 | 3/2013 | Courchesne et al. |
| 8,570,816 B2 | 10/2013 | Mutnury et al. |

(Continued)

FOREIGN PATENT DOCUMENTS

JP    2007299527 A    11/2007

OTHER PUBLICATIONS

Disclosed Anonymously, "Setting Memory Device VREF in a Memory Controller and Memory Device Interface in a Communication Bus" IBM TDB, IPCOM196496D., pp. 1-6.

*Primary Examiner* — Mohammed H Rehman
*Assistant Examiner* — Cheri L Harrington
(74) *Attorney, Agent, or Firm* — Cantor Colburn LLP; Nathan Rau

(57) ABSTRACT

A computer-implemented method for command-address-control calibration of a memory device includes starting, via a processor, a controller clock for the memory device, releasing, via the processor, a reset on the memory device, running, via the processor, a calibration pattern for calibrating the memory device by placing the memory device in calibration mode, where the calibration pattern is initiated prior to an initialization of the memory device, calibrating, via the processor, the memory device with a calibration setting based on the calibration pattern, and initializing the memory device based on the calibration setting.

14 Claims, 5 Drawing Sheets

(56) References Cited

U.S. PATENT DOCUMENTS

| | | | | |
|---|---|---|---|---|
| 8,582,374 B2* | 11/2013 | Mozak | ............... | G11C 5/147 327/530 |
| 8,760,945 B2 | 6/2014 | Jeon | | |
| 8,850,155 B2 | 9/2014 | Brandi et al. | | |
| 9,432,298 B1* | 8/2016 | Smith | ............... | H04L 49/9057 |
| 2003/0195714 A1* | 10/2003 | Jeddeloh | ............... | G11C 29/022 702/107 |
| 2008/0219068 A1* | 9/2008 | Kim | ............... | G11C 7/04 365/198 |
| 2011/0307717 A1* | 12/2011 | Fox | ............... | G11C 29/02 713/300 |
| 2011/0320867 A1* | 12/2011 | Chaudhuri | ............... | G06F 11/073 714/15 |
| 2012/0191964 A1* | 7/2012 | Lee | ............... | G06F 11/2284 713/2 |
| 2013/0038380 A1* | 2/2013 | Cordero | ............... | G06F 1/10 327/524 |
| 2013/0067189 A1* | 3/2013 | Heinrich | ............... | G06F 9/4411 711/170 |
| 2013/0159687 A1* | 6/2013 | Cox, Jr. | ............... | G11C 7/1066 713/1 |
| 2013/0346721 A1* | 12/2013 | Giovannini | ............... | G11C 7/222 711/167 |
| 2014/0032826 A1* | 1/2014 | Lee | ............... | G06F 12/00 711/104 |
| 2014/0032890 A1* | 1/2014 | Lee | ............... | G06F 9/4401 713/2 |
| 2014/0153344 A1* | 6/2014 | Kim | ............... | G11C 5/147 365/189.09 |
| 2014/0153680 A1* | 6/2014 | Garg | ............... | H04L 7/0025 375/371 |
| 2014/0189224 A1* | 7/2014 | Kostinsky | ............... | G11C 7/1063 711/105 |
| 2016/0172013 A1* | 6/2016 | Dearth | ............... | G06F 1/10 711/106 |
| 2016/0291985 A1* | 10/2016 | Jenkins | ............... | G06F 3/0619 |
| 2016/0314822 A1* | 10/2016 | Yeung | ............... | G06F 13/16 |
| 2017/0017252 A1* | 1/2017 | Wu | ............... | H03M 1/76 |
| 2017/0110169 A1* | 4/2017 | Kim | ............... | G11C 7/12 |
| 2017/0177019 A1* | 6/2017 | Wu | ............... | G05F 3/26 |
| 2017/0337143 A1* | 11/2017 | Venkatesan | ............... | G06F 13/1668 |
| 2018/0011528 A1* | 1/2018 | Srivastava | ............... | G06F 1/3215 |

* cited by examiner

MEMORY DEVICE COMMAND-ADDRESS-CONTROL CALIBRATION

BACKGROUND

The present disclosure relates to memory device command-address-control, and more specifically, to calibration of memory device command-address-control.

Engineers encounter memory test and simulation idiosyncrasies while designing, testing and validating the memory communication bus of memory devices because of variations in hardware that may cause testing models to inaccurately reflect the hardware. Memory controller bus timing values are commonly refined periodically for proper operation and margin across a large sample of hardware, which is both labor intensive and time consuming. Each time the memory controller bus timing values are refined or modified, or the hardware is modified, the validation process must be repeated and re-tested for the new settings and/or hardware.

More particularly, current memory calibration and validation systems may not dynamically calibrate the command-address-control nets at the device level relative to their reference voltage supplied by the controller. This may lead to memory performance for the devices being sub-optimal and not completely reliable. Moreover, current systems do not perform dynamic calibration of command-address-control nets at device initialization and do not provide the option of being periodically adjusted during device runtime. Accordingly, they do not allow the best possible values for each device on the command-address-control flyby to calibrate itself for the most optimal setup, hold, and reference voltage settings for optimal device operation. Calibration does not run automatically at power on and requires an initial passing setting. These development limitations may lead to overall signal-integrity problems for some memory designs

SUMMARY

According to an embodiment of the present invention, a computer-implemented method for command-address-control calibration of a memory device is described. The method may include starting, via a processor, a controller clock for the memory device, releasing, via the processor, a reset on the memory device, running, via the processor, a calibration pattern for calibrating the memory device by placing the memory device in calibration mode, where the calibration pattern is initiated prior to an initialization of the memory device, calibrating, via the processor, the memory device with a calibration setting based on the calibration pattern, and initializing the memory device based on the calibration setting.

According to other embodiments, a system for command-address-control calibration of a memory device is described. The system may include a memory controller. The memory controller may include a processor operatively connected to the memory device, the memory controller configured to start a controller clock for the memory device, release a reset on the memory device, run a calibration pattern for calibrating the memory device by placing the memory device in calibration mode, where the calibration pattern is initiated prior to an initialization of the memory device, calibrate the memory device with a calibration setting based on the calibration pattern, and initialize the memory device based on the calibration setting.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
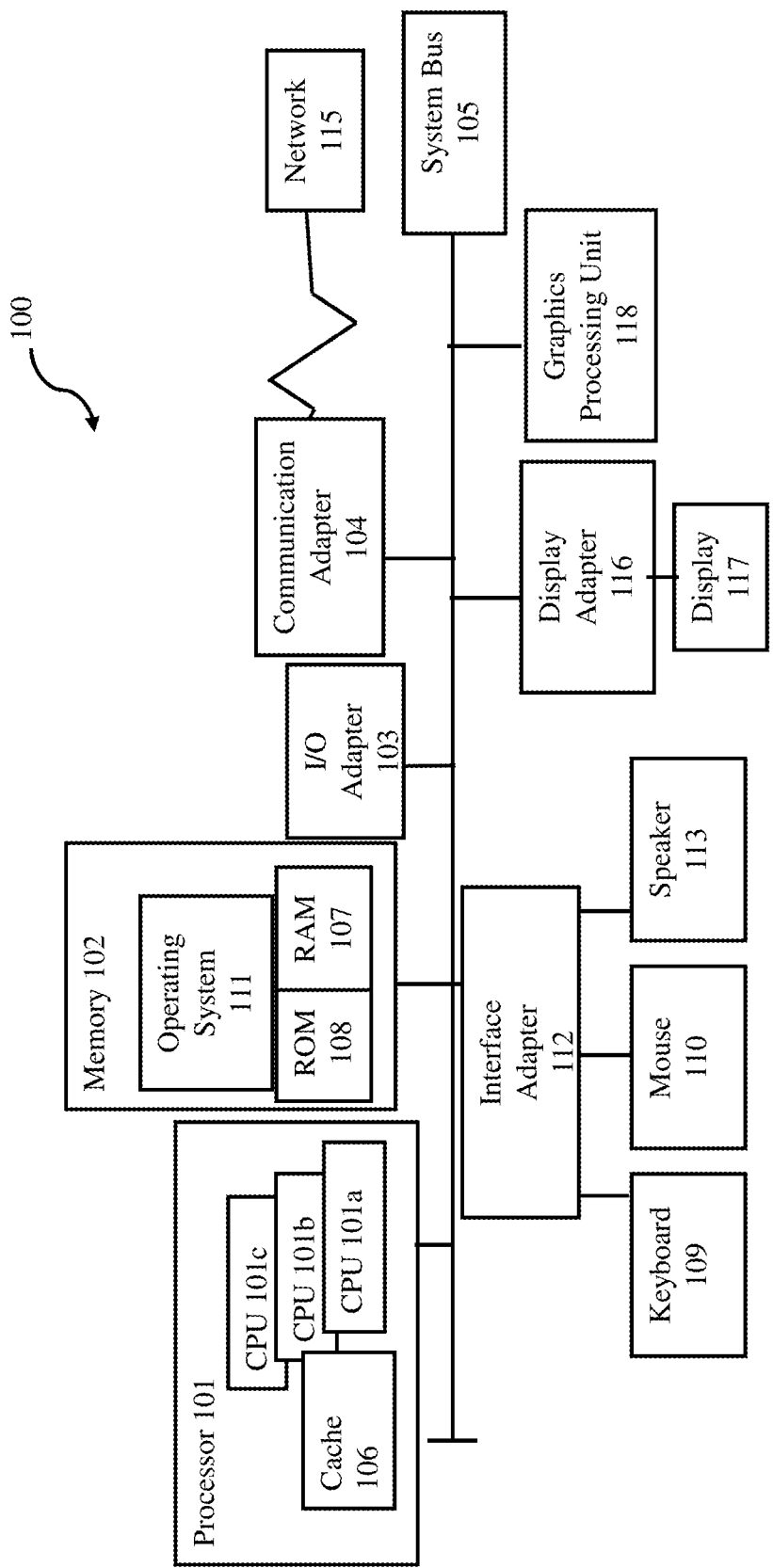
FIG. 1 depicts a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100, therefore, can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes a processor 101. Computer 100 also includes memory 102 coupled to processor 101, and one or more input/output adaptors 103 that may be communicatively coupled via system bus 105. Memory 102 may be operatively coupled to one or more internal or external memory devices. Communications adaptor 104 may operatively connect computer 100 to one or more networks 115. A system bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. Memory cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. Input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more input/output (I/O) devices to computer 100. For example, interface adaptor 112 may connect a keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Conventional memory calibration and validation systems may not dynamically calibrate the command-address-control nets at the device level relative to their reference voltage supplied by the controller. The command settings are generally determined by engineers during simulation and testing, where the most optimal voltage values and setup/hold settings are determined, then not adjusted thereafter. This may lead to memory performance for the devices being sub-optimal and not completely reliable. Moreover, current systems do not perform dynamic calibration of command-address-control nets prior to device initialization, and do not provide the option of being periodically adjusted during device runtime. Conventional memory calibration systems do not include an initial passing setting that takes into account the line variation in the board. In other aspects, in conventional testing systems, if engineers are running the calibration test at too fast of a speed, even if the calibration system can simulate it, the signal to noise ratio is likely going to be very low, and thus, an accurate simulation would be difficult. Variance in parts may be too great to simulate all of the different possible values. Command address must simulate every possible case (which may be time consuming and labor intensive). Every step must be repeated with each iterative hardware change.

It may be advantageous to determine, automatically using a processor-driven utility, the best possible values for each device on the command-address-control flyby such that the system may calibrate itself for an optimized setup/hold, and reference voltage settings. It may also be advantageous to create a system that runs automatically at power on, and dynamically calibrates the command-address-control nets at the device level relative to their reference voltage supplied by the controller. It may be advantageous to initially and periodically run, where the calibration does not require an initial passing setting prior to memory initialization.

Figure 2:
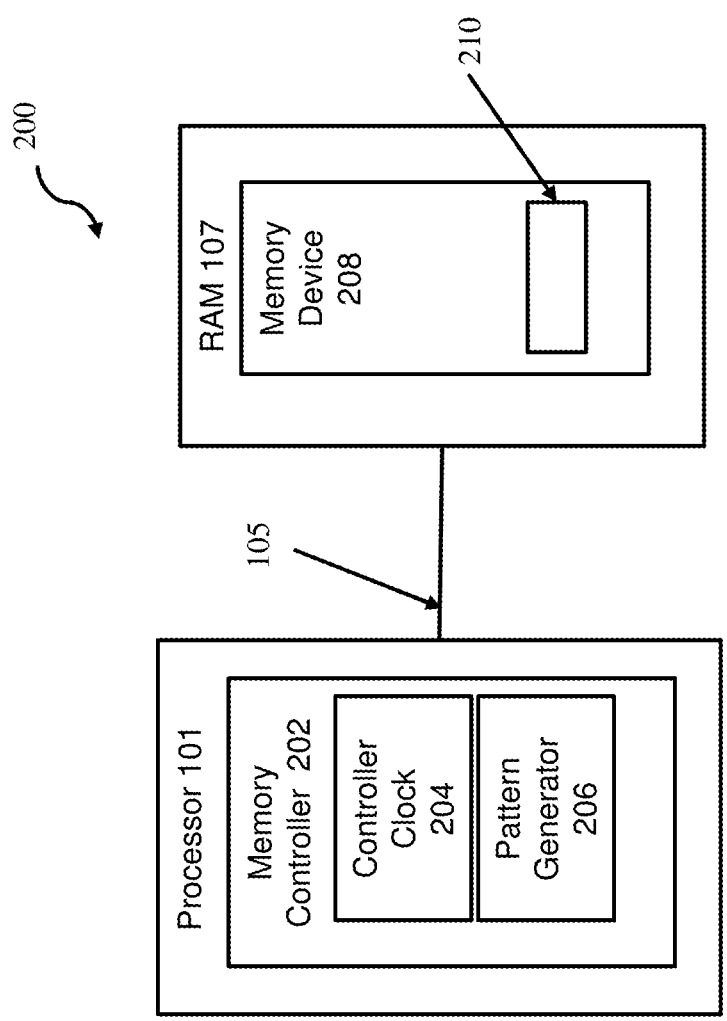
FIG. 2 depicts a system for calibration of a memory device according to one embodiment.

FIG. 2 depicts a system for calibration of a memory device, according to one embodiment. Referring now to FIG. 2, processor 101 may include a memory controller 202, a controller clock 204 and a pattern generator 206. Processor 101 may be configured to control RAM 107 via system bus 105. RAM 107 can include a memory device 208.

Memory controller 202 can be a digital circuit that manages the flow of data going to and from the computer's main memory (e.g. RAM 107). Memory controller 202 can be a separate chip, or as depicted in FIG. 2, integrated into another chip. For example, memory controller 202 may be included on the same die, or as an integral part of a microprocessor (e.g., processor 101). Memory controller 202 may contain the logic necessary to read and write to DRAM (e.g., memory device 208), and to refresh the DRAM. Without constant refreshes, memory device 208 can lose the data written to it as the capacitors (not shown) leak their charge within a fraction of a second.

Memory controller 202 may read and write to memory device 208 by selecting the row and column data addresses of the DRAM as the inputs to a multiplexer circuit (not shown), where a demultiplexer (not shown) on memory device 208 uses the converted inputs to select the correct memory location and return the data, which is then passed back through the multiplexer to consolidate the data in order to reduce the operational bus width for system BUS 105.

Memory controller 202 may include one or more controller clocks 204. Controller clock 204 may make memory device 208 synchronous. Controller clock 204 may generate anywhere from one to four clock signals, and in some embodiments, more than four clock signals. Controller clock 204 can be responsible for generating all of the clocks for self-test of memory device 208. Controller clock 204 may also be configured to receive external clock signals and pass them directly to memory device 208, or generate its own clocks from an external oscillator (not shown).

Pattern generator 206 may be configured to enable memory controller 202 to alter the instruction memory to create new or modified test patterns, or to change the sequence or number of patterns applied at each manufacturing test gate of memory device 208. According to some embodiments, pattern generator 206 may be configured to provide a predefined pattern (e.g., 0101, holding low for two counts, high for two counts, etc.). A predefined pattern may also include holding memory device 208 in a tri-state for a predetermined amount of time (e.g., for five cycles, ten cycles, etc.). A tri-state, (or 3-state) logic may allow an output port to assume a high impedance state in addition to the 0 and 1 logic levels, effectively removing the output from the circuit. This could allow multiple circuits to share the same output line or lines (such as a bus which cannot listen to more than one device at a time).

Memory device 208 may be a DRAM memory module having a fly-by topology. A fly-by topology, in some aspects, may be a wiring interconnect structure in which the source (driver) connects to two or more devices that may be connected along the length of a wire (not shown) that is generally terminated at the far end, where the devices along the wire may receive the signal from the source at a time that is based on the flight time through the wire and the distance from the source. Memory device 208 may include two flip-flops 210 configured to determine clock to address/control relationships. The state of the flip-flops may determine clock to address/control relationships when memory controller 202 reaches a boundary for setup or hold. Boundaries are shown in greater detail with respect to FIG. 3.

Memory device 208 may be configured to generate its own reference voltage and sweep the reference voltage until an optimal setup/hold setting is determined by memory controller 202. According to some embodiments, memory device 208 may be configured to composite address data via an "and" function, and thus, may provide an optimal composite solution. An optimal composite solution may be a solution having command-address-control nets supplied by memory controller 202 that have a valid low to high transition state, as shown in an eye diagram.

Figure 3:
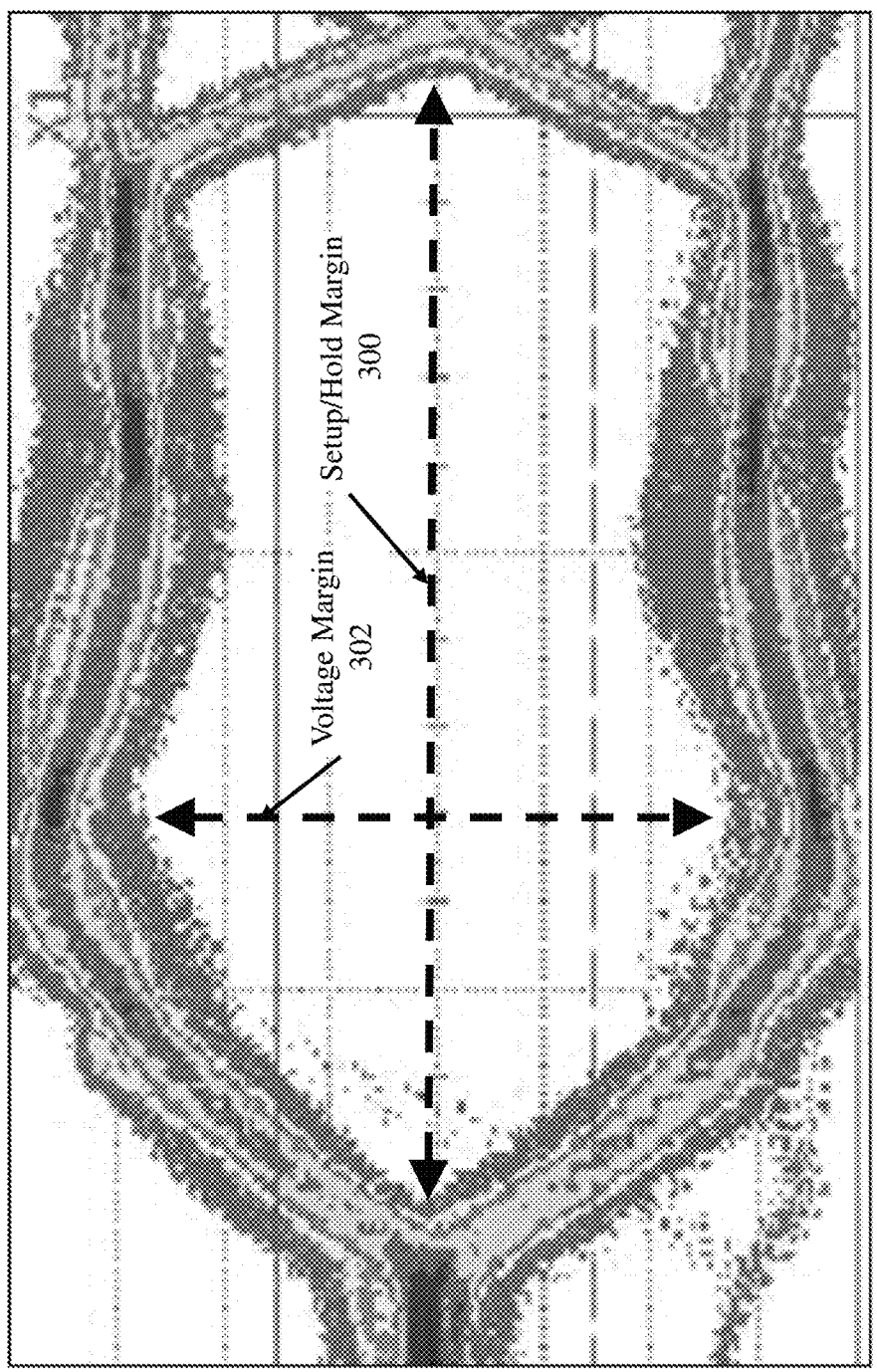
FIG. 3 depicts an eye diagram used in calibration of a memory device according to one embodiment.

FIG. 3 depicts an eye diagram used in calibration of a memory device, according to one embodiment. An oscilloscope generates an eye diagram by overlaying sweeps of different segments of a long data stream driven by a master clock (e.g., controller clock 204). The triggering edge may be positive or negative, but the displayed pulse that appears after a delay period may go either way; there is no way of knowing beforehand the value of an arbitrary bit. Therefore, when many such transitions have been overlaid by an oscilloscope, positive and negative pulses are superimposed on each other. Overlaying many bits produces an eye diagram, so called because the resulting image looks like the opening of an eye.

Referring now to FIG. 3, an eye diagram is depicted showing a voltage margin 302 (depicted as a vertical line) and a setup/hold margin 300 (depicted as a horizontal line). The eye diagram of FIG. 3 shows an exemplary calibration routine designed to sweep for setup and hold while adjusting the reference voltage up and down to find the optimal reference voltage with the best margin relative to controller clock 204. Boundaries are shown in FIG. 3 as terminating each of the arrows 300 and 302.

Figure 4:
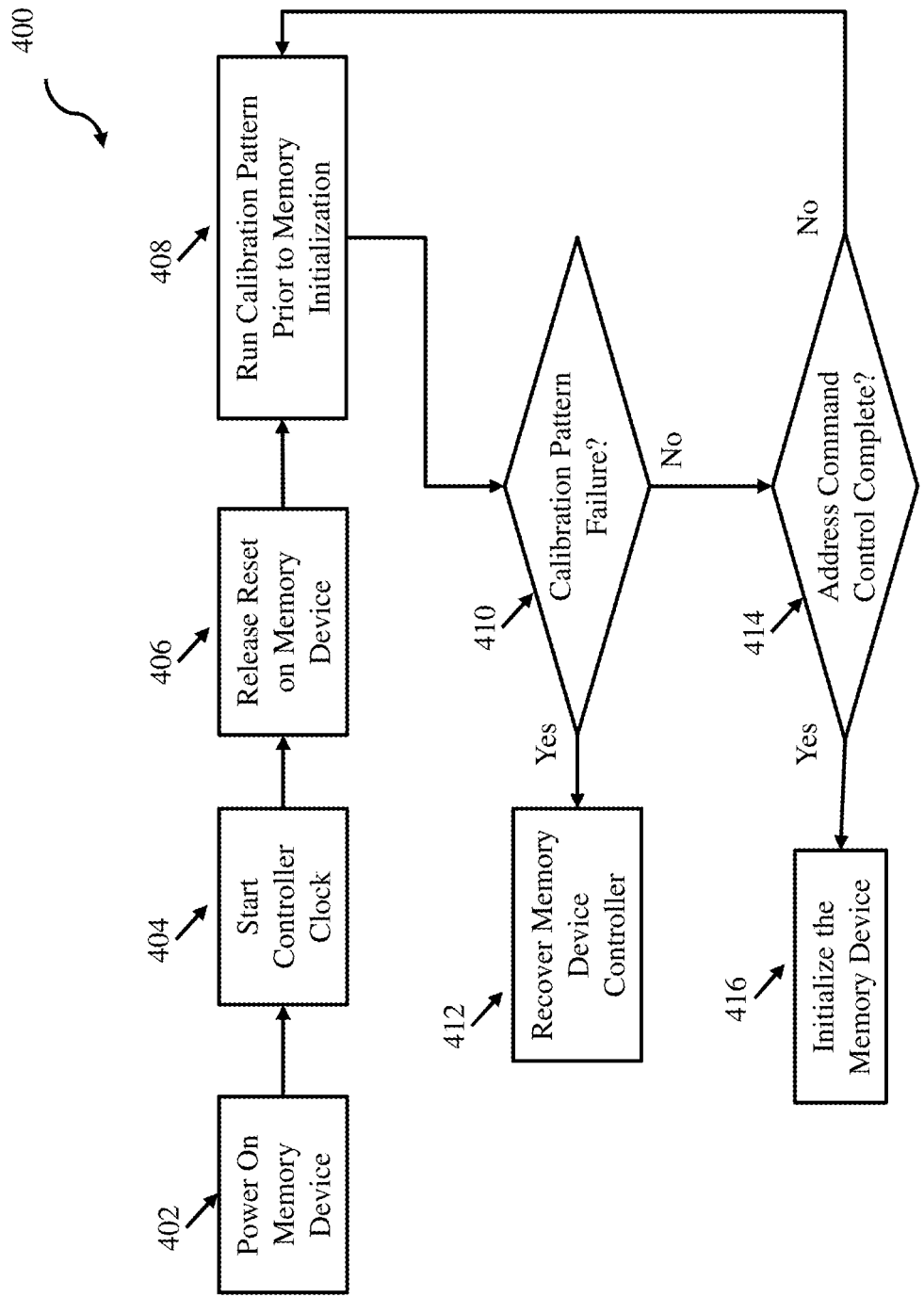
FIG. 4 depicts a flow diagram of a method for calibration of a memory device according to one embodiment.

FIG. 4 depicts a flow diagram of a method 400 for calibration of a memory device, according to one embodiment. Referring now to FIG. 4, according to one embodiment, as shown in block 402, processor 101 may power on memory device 208, then start controller clock 204 for memory device 208, as shown in block 404.

As shown in block 406, processor 101 may release reset on memory device 208.

Next, processor 101 may run a calibration pattern prior to memory initialization, as shown in block 408. Memory controller 202 may begin a pattern transfer after a predetermined period of time (e.g., 1000 clock cycles) after reset, but before the device is fully initialized. Memory controller 202 may start pattern transfers by looking for a valid low to high transition state, and noting the occurrence. Notably, conventional systems do not dynamically calibrate the command-address-control nets at the device level relative to their reference voltage supplied by the controller, initially and prior to memory device initialization. As shown in the present invention, processor 101 may dynamically calibrate and train an interface to provide the best margins possible, prior to initialization of memory device 208.

In some aspects, processor 101 may run the calibration pattern for calibrating memory device 208 by placing memory device 208 in calibration mode, where the calibration pattern is initiated prior to an initialization of memory device 208. Processor 101 may latch a command signal, an address signal, and control signal relative controller clock 204. Calibration may further include generating, via processor 101, a reference voltage supplied by memory controller 202, and sweeping the reference voltage by a predetermined increment up and down until a setup and hold setting is found by processor 101. Processor 101 can then latch command, address, and control signals relative to the fly-by clock (e.g., controller clock 204). Accordingly, memory controller 202 may be configured to drive a random pattern across the address to ensure an optimal run-time solution is achieved. According to some embodiments, system 200 will attempt to calibrate, then test the opposite state in the event of a failure. This process happens in all aspects prior to initialization of memory device 208.

In other aspects, processor 101 may calibrate memory device 208 with a calibration setting based on the calibration pattern by adjusting the setup and hold settings to meet a predetermined margin relative to controller clock 204. A predetermined margin could be exemplified as a boundary on an eye diagram (e.g., as shown in FIG. 3), which may be indicative of a voltage component and a boundary on a setup and hold component. In other aspects, the predetermined margin may be a selectable reference voltage value at the memory device.

Figure 5:
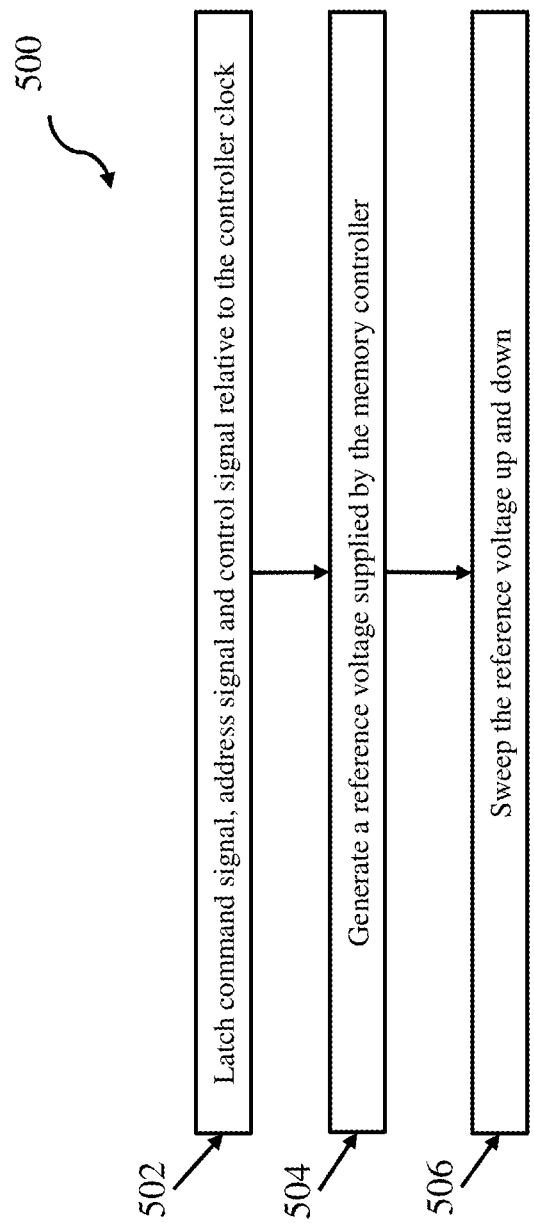
FIG. 5 depicts a flow diagram of a method for running a calibration setting, according to one embodiment.

FIG. 5 depicts a flow diagram of a method 500 for running a calibration setting, according to one embodiment. Referring briefly to FIG. 5, as shown in block 502, processor 101 may latch a command signal, an address signal, and control signal relative the controller clock 204. As shown in block 504, processor 101 may generate a reference voltage supplied by memory controller 202, and sweep the reference voltage by a predetermined increment up and down until a setup and hold setting is found by processor 101 (as shown in block 506).

The setup and hold setting found by processor 101 may, according to some embodiments, meet a predetermined margin relative to controller clock 204. For example, a predetermined margin may provide the widest possible delay at the highest voltage for run time. According to some embodiments, a predetermined margin may occur where processor 101 determines the largest setup and hold values (e.g., left and right of the clock (vertical line) in the eye shown in FIG. 3). In other aspects, processor 101 may determine an optimized voltage margin (e.g., the horizontal dashed line as shown in FIG. 3). Accordingly, processor 101 may configure the DRAM to reference data at the horizontal voltage level with a clock delay that places the clock edge at the vertical dashed line. In other aspects, the calibration setting may be splittable, by processor 101, into calibration groups for command, address, and control.

Referring again to FIG. 4, after running the calibration pattern, processor 101 may determine whether the calibration setting has resulted in a calibration pattern failure, as shown in decision block 410. For a failure, processor 101 may cause memory device 208 to drive its failed non-calibrated pattern (for example all 0's on data lines).

As shown in block 412, processor 101 may recover memory controller 202 in the event of a pattern failure. Accordingly, processor 101 may maintain contain a register to read out the solution at the controller for setup/hold margin and voltage set point. In some aspects, processor 101 may de-configure that channel of memory, to retry the entire sequence (with all patterns). In other aspects, processor 101 may load in one or more predefined values as candidate values, to automatically determine an optimized configuration for a simulation.

If a pattern failure condition did not occur, as shown in decision block 414, processor 101 may determine whether the address command control calibration resulted in completion. For a pass, memory controller 202 may finish the remaining interface and then begin initialization. According to some embodiments, processor 101 may determine completion of the sequence with all the setup and hold measurements on all valid reference voltage settings (to the diagram are run by processor 101. In some aspects, processor 101 may take the setup and hold measurements at the horizontal dashed line (as shown in FIG. 3) and at all valid options above and below it (e.g., 10 mV increments above and below the horizontal dashed line to device maximum and minimum values). When that process is complete and processor 101 has calculated best-case margins (largest and most-balanced setup/hold at a given voltage), processor 101 may store these values and return that the process is complete. If the command control did not complete (e.g., a failure occurred), processor 101 may iteratively calibrate another random pattern until command control completes.

As shown in block 416, after calibration, processor 101 may initialize memory device 208 based on the calibration setting.

Presently disclosed embodiments may dynamically calibrate the command-address-control nets at the device level relative to their reference voltage supplied by the controller for optimal performance and device reliability. Accordingly, dynamic calibration may be done at device initialization and may also have the option of being periodically done during runtime of memory device 208. Memory controller 202, and devices being controlled (e.g., memory device 208) may be configured to achieve the optimal solution for a layout presented for optimization.

According to other aspects, processor 101 may calibrate memory device 208 with a secondary calibration after the initialization of the memory device. The secondary calibration may be configured to run periodically, at a predefined period of time. For example, processor 101 may be configured to perform memory calibration every 100,000 clock cycles, etc.

In other aspects, the secondary calibration may be selectably performed by processor 101 according to a user input. For example, processor 101 may prompt for and receive a user input indicative of the predefined period of time.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, conterminously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   performing dynamic command-address-control calibration of a memory device relative to a reference voltage supplied by a memory controller prior to the memory device being fully initialized, the performing comprising:

starting, via a processor, a controller clock for the memory device;

releasing, via the processor, a reset on the memory device;

running, via the processor, a calibration pattern for calibrating the memory device by placing the memory device in calibration mode, wherein the calibration pattern is initiated after a predetermined period of time subsequent to the releasing a reset on the memory device; and calibrating, via the processor, the memory device with a calibration setting based on the calibration pattern, the calibrating comprising:

latching, via the processor, a command signal, an address signal, and a control signal relative to the controller clock;

generating, via the processor, a reference voltage supplied by a memory controller; and sweeping, via the processor, the reference voltage by a predetermined increment up and down until a setup and hold setting is found by the processor, wherein the setup and hold setting meets a predetermined margin relative to the controller clock, and wherein the memory device includes two flip-flops configured to determine controller clock to address signal and control signal relationships at the setup and hold setting; and initializing the memory device based on the calibration setting.

2. The computer-implemented method according to claim 1, further comprising:

calibrating, via the processor, the memory device with a secondary calibration after the initialization of the memory device.

3. The computer-implemented method according to claim 2, wherein the secondary calibration is periodic at a predefined period of time.

4. The computer-implemented method according to claim 2, wherein the secondary calibration is selectably performed according to a user input.

5. The computer-implemented method according to claim 1, wherein the predetermined margin comprises a boundary on an eye diagram indicative of a voltage component and a boundary on a setup and hold component.

6. The computer-implemented method according to claim 5, wherein the predetermined margin further comprises a selectable reference voltage value at the memory device.

7. The computer-implemented method according to claim 1, further comprising receiving, via the processor, a user input and overriding the calibration setting with the user input.

8. A system comprising:

a memory controller comprising a processor operatively connected to a memory device, the memory controller configured for:

performing dynamic command-address-control calibration of the memory device relative to a reference voltage supplied by the memory controller prior to the memory device being fully initialized, the performing comprising:

starting a controller clock for the memory device;

releasing a reset on the memory device;

running a calibration pattern for calibrating the memory device by placing the memory device in calibration mode, wherein the calibration pattern is initiated after a predetermined period of time subsequent to the releasing a reset on the memory device; and calibrating the memory device with a calibration setting based on the calibration pattern, the calibrating comprising:

latching, via the processor, a command signal, an address signal, and a control signal relative to the controller clock;

generating, via the processor, a reference voltage supplied by a memory controller; and sweeping, via the processor, the reference voltage by a predetermined increment up and down until a setup and hold setting is found by the processor, wherein the setup and hold setting meets a predetermined margin relative to the controller clock, and wherein the memory device includes two flip-flops configured to determine controller clock to address signal and control signal relationships at the setup and hold setting; and initializing the memory device based on the calibration setting.

9. The system according to claim 8, wherein the memory controller is further configured to:

calibrate the memory device with a secondary calibration after the initialization of the memory device.

10. The system according to claim 9, wherein the secondary calibration is periodic at a predefined period of time.

11. The system according to claim 9, wherein the secondary calibration is selectably performed by the memory controller according to a user input.

12. The system according to claim 8, wherein the predetermined margin comprises a boundary on an eye diagram indicative of a voltage component and a boundary on a setup and hold component.

13. The system according to claim 12, wherein the predetermined margin further comprises a selectable reference voltage value at the memory device.

14. The system according to claim 8, wherein the memory controller may receive a user input and override the calibration setting with the user input.

* * * * *